US010901225B1

(12) United States Patent
De Nardi et al.

(10) Patent No.: US 10,901,225 B1
(45) Date of Patent: Jan. 26, 2021

(54) SYSTEMS AND METHODS FOR POSITIONING A HEAD-MOUNTED DISPLAY

(71) Applicant: Facebook Technologies, LLC, Menlo Park, CA (US)

(72) Inventors: Renzo De Nardi, Seattle, WA (US); Kieran Connor Kelly, Seattle, WA (US); Brett Delainey Christie, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 19 days.

(21) Appl. No.: 16/407,219

(22) Filed: May 9, 2019

(51) Int. Cl.
*G02B 27/01* (2006.01)
*H04N 13/332* (2018.01)

(52) U.S. Cl.
CPC ....... *G02B 27/0176* (2013.01); *H04N 13/332* (2018.05); *G02B 2027/0123* (2013.01); *G02B 2027/0143* (2013.01); *G02B 2027/0161* (2013.01); *G02B 2027/0178* (2013.01)

(58) Field of Classification Search
CPC ........ G02B 27/0176; G02B 2027/0123; G02B 2027/0143; G02B 2027/0161; G02B 2027/0178; H04N 13/332
See application file for complete search history.

(56) References Cited

U.S. PATENT DOCUMENTS

| 2005/0078378 | A1* | 4/2005 | Geist | G02B 27/0172 359/630 |
| 2014/0266986 | A1* | 9/2014 | Magyari | G02B 27/0172 345/8 |
| 2019/0369353 | A1* | 12/2019 | Franklin | G02B 7/023 |

OTHER PUBLICATIONS

Strasdat et al., "Systems and Methods for Display Synchronization In Head-Mounted Display Devices", U.S. Appl. No. 16/008,623, filed Jun. 14, 2018, 63 pages.
Newcombe et al., "Apparatus, System, and Method for Improving Digital Head-Mounted Displays", U.S. Appl. No. 15/997,259, filed Jun. 4, 2018, 43 pages.

* cited by examiner

*Primary Examiner* — Peter D McLoone
(74) *Attorney, Agent, or Firm* — FisherBroyles, LLP

(57) ABSTRACT

The disclosed systems for positioning head-mounted displays may include a first track along which a display apparatus of a head-mounted display is configured to move in a first direction and a second track along which the display apparatus is configured to move in a second, different direction. A first electromechanical actuator may move the display apparatus along the first track, and a second electromechanical actuator may move the display apparatus along the second track. Various other methods and systems are also disclosed.

20 Claims, 9 Drawing Sheets

800

Move a display assembly along a first track in a first direction that is substantially vertical
810

↓

Move the display assembly along a second track in a second direction that is substantially horizontal
820

SYSTEMS AND METHODS FOR POSITIONING A HEAD-MOUNTED DISPLAY

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 8 is a flowchart illustrating a method for positioning a head-mounted display according to at least one embodiment of the present disclosure.

Figure 1:
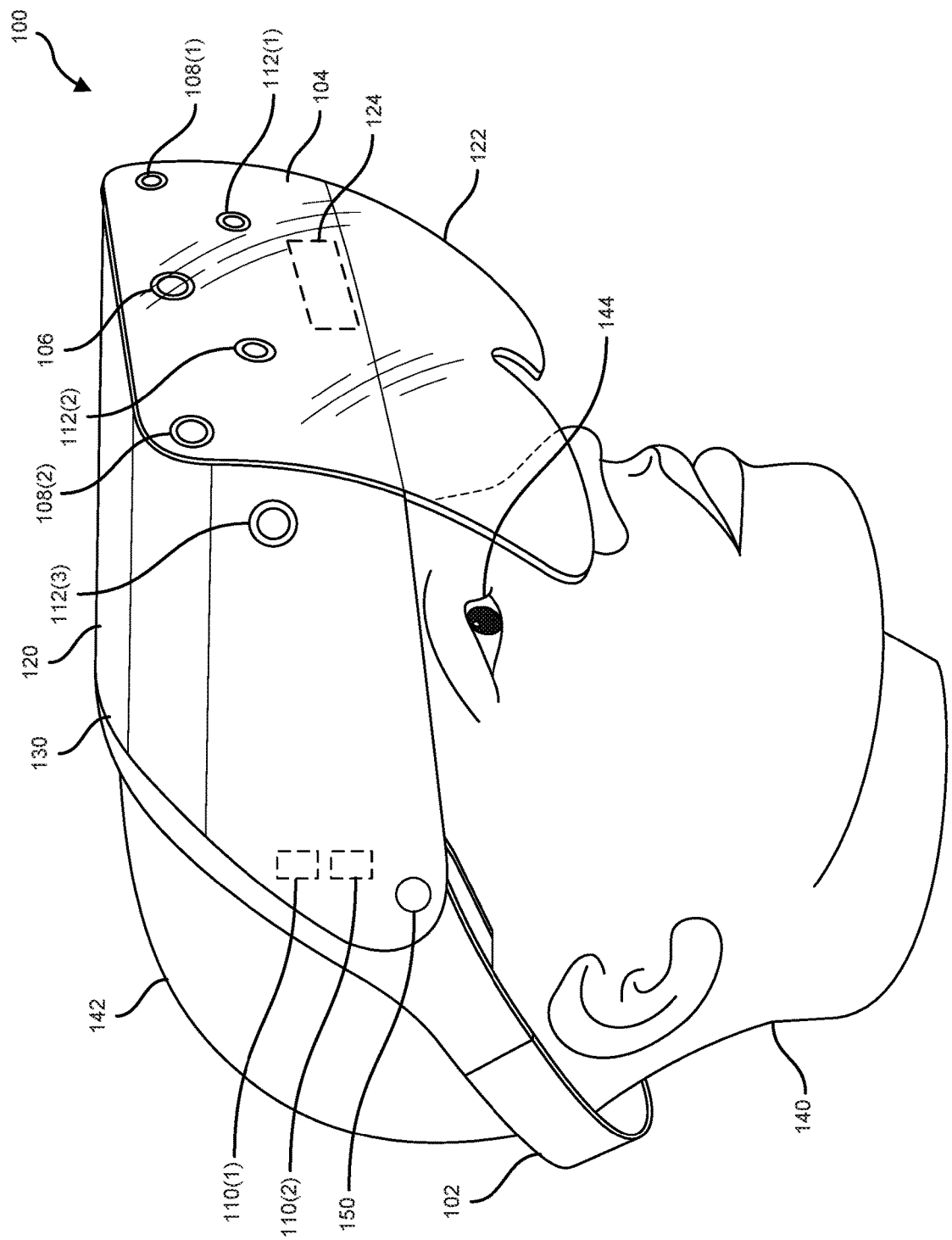
FIG. 1 is a perspective view of a head-mounted display system worn by a user according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

Artificial-reality systems, such as virtual-reality systems or augmented-reality systems, typically display computer-generated content to users in order to create immersive experiences. The content may be displayed on a head-mounted display ("HMD"). For example, a virtual-reality system may create three-dimensional renderings to simulate an environment or a virtual space. Alternatively, augmented-reality systems may merge computer-generated content with a user's view of a real-world environment to enhance interactions with the real-world environment. These systems may provide users with the ability to navigate and alter digital content that may provide helpful information about real-world objects.

Different users have different head and face shapes and sizes. For example, a particular user's eyes may be positioned at one distance from the user's forehead (e.g., a so-called pupil-to-forehead ("PTF") distance), while another user's eyes may be positioned farther from or closer to the user's forehead. In addition, some users' eyes are more or less inset than others' eyes (e.g., a so-called eye relief or inset distance). Many conventional HMDs are not adjustable to accommodate the PTFs or eye reliefs of different users. Some conventional HMDs may be adjustable for different users, but the adjustments often involve replacing parts or making somewhat difficult manipulations (e.g., with tools).

The present disclosure is generally directed to systems and methods for adjusting a position of an HMD relative to a user's eyes, such as to accommodate users having different head sizes, head shapes, facial features, PTFs, and/or eye reliefs. As will be explained in greater detail below, embodiments of the present disclosure may include systems for positioning HMDs that may include a first track and a second track. A display apparatus of the HMD may be movable along the first track in a first direction (e.g., substantially vertical) by actuation of a first electromechanical actuator. The display apparatus may be movable along the second track in a second, different direction (e.g., substantially horizontal) by actuation of a second electromechanical actuator. Various examples and embodiments of these concepts are described in the present disclosure.

Figure 9:
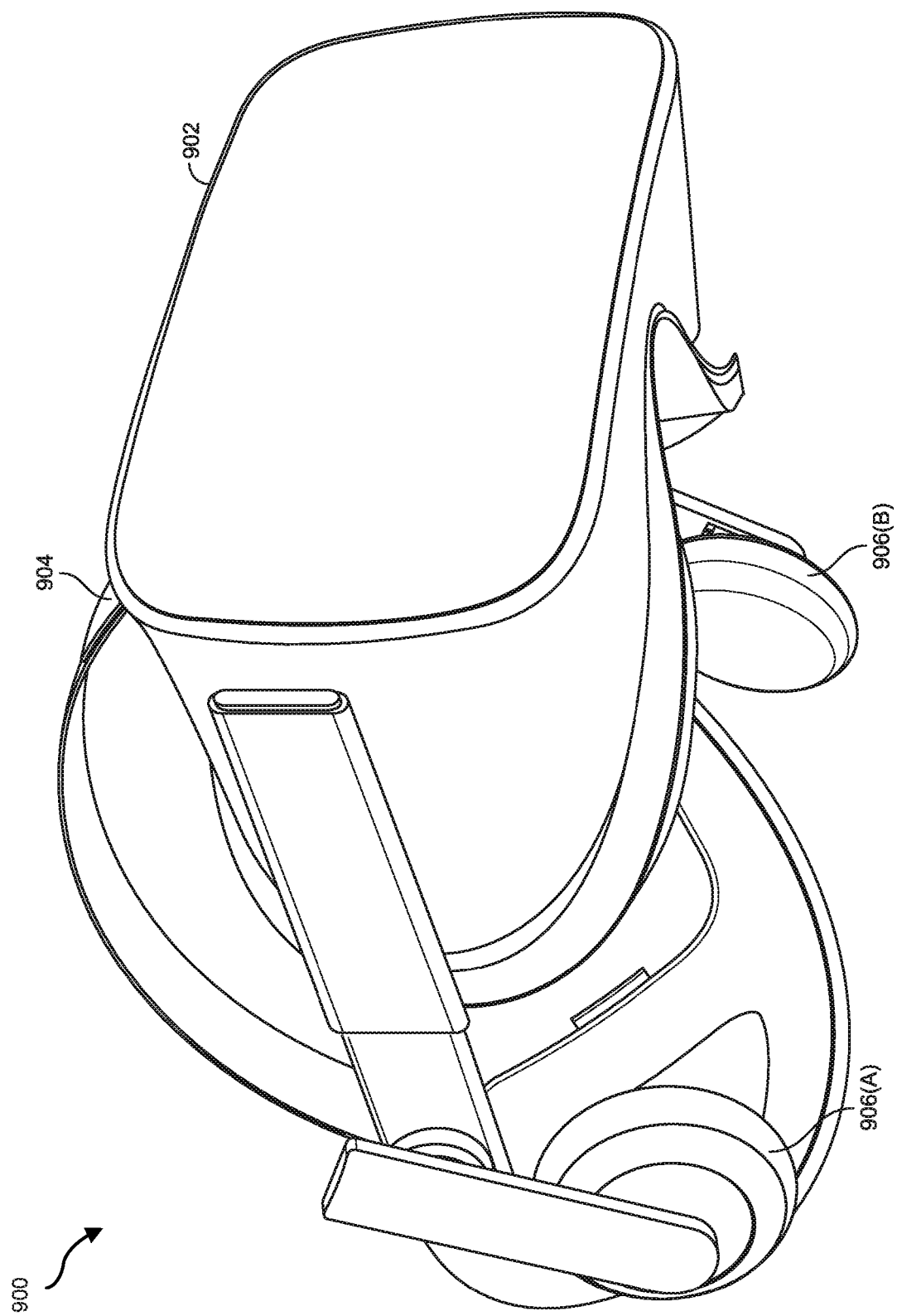
FIG. 9 is an illustration of an example virtual-reality headset that may be used in connection with embodiments of this disclosure.

The following will provide, with reference to FIG. 1, detailed descriptions of an HMD system capable of generating and displaying computer-generated images, such as those used in augmented reality systems. In addition, the discussion associated with FIGS. 2-3 will provide descriptions of example display apparatuses for use with HMD systems. With reference to FIGS. 4-7, the following will provide detailed descriptions of example HMD systems with adjustment mechanisms. With reference to FIG. 8, the following will provide detailed descriptions of example methods for positioning an HMD. The following will provide, with reference to FIG. 9, detailed descriptions of an example artificial-reality system that may be used in connection with embodiments of this disclosure.

FIG. 1 illustrates a perspective view of an example HMD system 100 worn by a user 140. As shown in FIG. 1, the HMD system 100 may include a wearable frame 102 securable to the user's head 142. The HMD system 100 may also include a mapping subsystem 104 that maps a local environment of user 140 when wearable frame 102 is secured to the user's head 142. Additionally, the HMD system 100 may include a display apparatus 120 mounted to the wearable frame 102 and configured to direct computer-generated images toward the user's eyes 144. In some examples, the display apparatus 120 may be a varifocal display, which may be configured to direct the computer-generated images toward the user's eyes 144 at a variable focal length. The term "varifocal display" may, in some examples, refer to a digital display, screen, or subsystem that is capable of emulating images at different focal lengths from a viewer's perspective (by, e.g., adjusting the position or orientation of a lens or display, as described in greater detail below). In addition, the term "focal length" may, in some examples, refer to a distance between a lens and a focus related to the lens. For example, a focal length may include a distance between the user's eyes 144 and the computer-generated images, a distance between the images and a display of the images, a distance between a camera lens and the local environment, and/or any other suitable distance that may be adjusted to alter the perceived focus of the computer-generated images.

In some embodiments, the mapping subsystem 104 may include a projector 106 that projects structured light into the local environment. The mapping subsystem 104 may also include an array of depth cameras, such as depth cameras 108(1) and 108(2), that captures reflections of the structured light from the local environment. Furthermore, the mapping subsystem 104 may include localization devices 110(1) and 110(2) that may determine a location of the HMD system 100. Additionally, the mapping subsystem 104 may include an array of photographic cameras, such as photographic cameras 112(1), 112(2), and 112(3) illustrated in FIG. 1, that captures visible-spectrum light from the local environment. In one embodiment, the localization devices 110(1) and/or 110(2) and/or the photographic cameras 112(1)-(3) may be arranged to face forward and/or to the sides of the user 140 to capture a wide field of view.

In some examples, the localization devices 110(1) and/or 110(2) may include a localization camera that captures image data for determining a relative position of the HMD system 100 within the local environment and/or a localization sensor that identifies movement of the HMD system 100 within the local environment. For example, the localization device 110(1) may represent a set of localization cameras that utilizes a simultaneous localization and mapping (SLAM) system to detect the location of the HMD system 100 relative to other objects and entities within the local environment. As another example, the localization device 110(2) may include an inertial measurement unit (IMU) (e.g., gyroscope, accelerometer, etc.) that detects the movement or orientation of the HMD system 100 to determine a change in a location of the user 140.

In some examples, the mapping subsystem 104 may construct a digital map of the local environment based on data collected from the various devices of the mapping subsystem 104. For example, the mapping subsystem 104 may detect changes in the position of the user's head 142 and update a constructed map accordingly. Although illustrated in FIG. 1 with a certain number of cameras, sensors, and/or devices, the HMD system 100 may include additional similar devices to improve the accuracy of mapping the local environment while the user 140 is wearing the HMD system 100.

In one embodiment, the display apparatus 120 may include an optical combiner 122 (also referred to herein as "combiner 122" for simplicity) that reflects the computer-generated images toward the user's eyes 144. The term "combiner" may, in some examples, refer to a device or system that combines multiple sources of image data to present a unified view, such as by mixing digital and real-world images to create an augmented view.

In the above embodiment, the display apparatus 120 may be mounted to the wearable frame 102 such that the combiner 122 is visible to the user 140 when the wearable frame 102 is secured to the user's head 142. Additionally, the HMD system 100 may include an eye-tracking subsystem 124 mounted to the wearable frame 102. The eye-tracking subsystem 124 may track the user's eyes 144 when the HMD system 100 is secured to the user's head 142 to detect movement of the user's eyes 144. In this embodiment, the eye-tracking subsystem 124 may include one or more sensors and/or cameras capable of tracking changes in the user's eyes 144 that may indicate a change in a direction or a focus of vision. For example, the eye-tracking subsystem 124 may include a light source (such as an infrared (IR) light source) configured to project (either directly or via the combiner 122) IR light onto the user's eyes 144. One or more IR sensors or cameras included within the eye-tracking subsystem 124 may then receive (either directly or via the combiner 122) IR light reflected off of the user's eyes 144. A computing subsystem 130 may then analyze sensor data generated by the IR sensors or cameras to determine where the user 140 is gazing. In this example, the eye-tracking subsystem 124 may independently track each eye 144 of the user 140 and/or track both eyes 144 to determine the direction of gaze and/or interpupillary distance indicating a focal distance of the gaze.

In some examples, the computing subsystem 130 may be communicatively coupled to the mapping subsystem 104, the display apparatus 120, and the eye-tracking subsystem 124. The computing subsystem 130 generally represents any type or form of computing device or system capable of reading computer-executable instructions. For example, the computing subsystem 130 may represent one or more devices or portions of devices within the HMD system 100 that are capable of sending, receiving, storing, and/or analyzing data generated by one or more of the various components of the HMD system 100. Alternatively, the computing subsystem 130 may represent one or more separate or external devices in communication with the HMD system 100, such as by wired or wireless means.

The HMD system 100 may also include a user input mechanism 150 (e.g., an electromechanical control input mechanism, which may include a knob, a switch, a slider, a lever, a touch-sensitive mechanism, etc.) for adjusting a position of the display apparatus 120 relative to the user's eyes 144. For example, as will be explained further below with reference to FIGS. 4-7, manipulation of the user input mechanism 150 may result in movement of the display apparatus 120 in a substantially vertical direction and/or in a substantially horizontal direction, such as to position the combiner 122 in a comfortable location within the natural field of view of the user's eyes 144. In some examples, "substantially vertical" may refer to a direction that has a vertical component, such as relative to an upright user. A substantially vertical direction may be a direction (e.g., following a linear path) or a combination of directions (e.g., following a curved path) that includes both vertical and horizontal components. The vertical component(s) of a substantially vertical direction may be equal to or greater than the horizontal component(s). Conversely, "substantially horizontal" may, in some examples, refer to a direction that has a horizontal component, such as relative to an upright user. A substantially horizontal direction may be a direction or a combination of directions that includes both horizontal and vertical components. The horizontal component(s) of a substantially horizontal direction may be equal to or greater than the vertical component(s).

Figure 2:
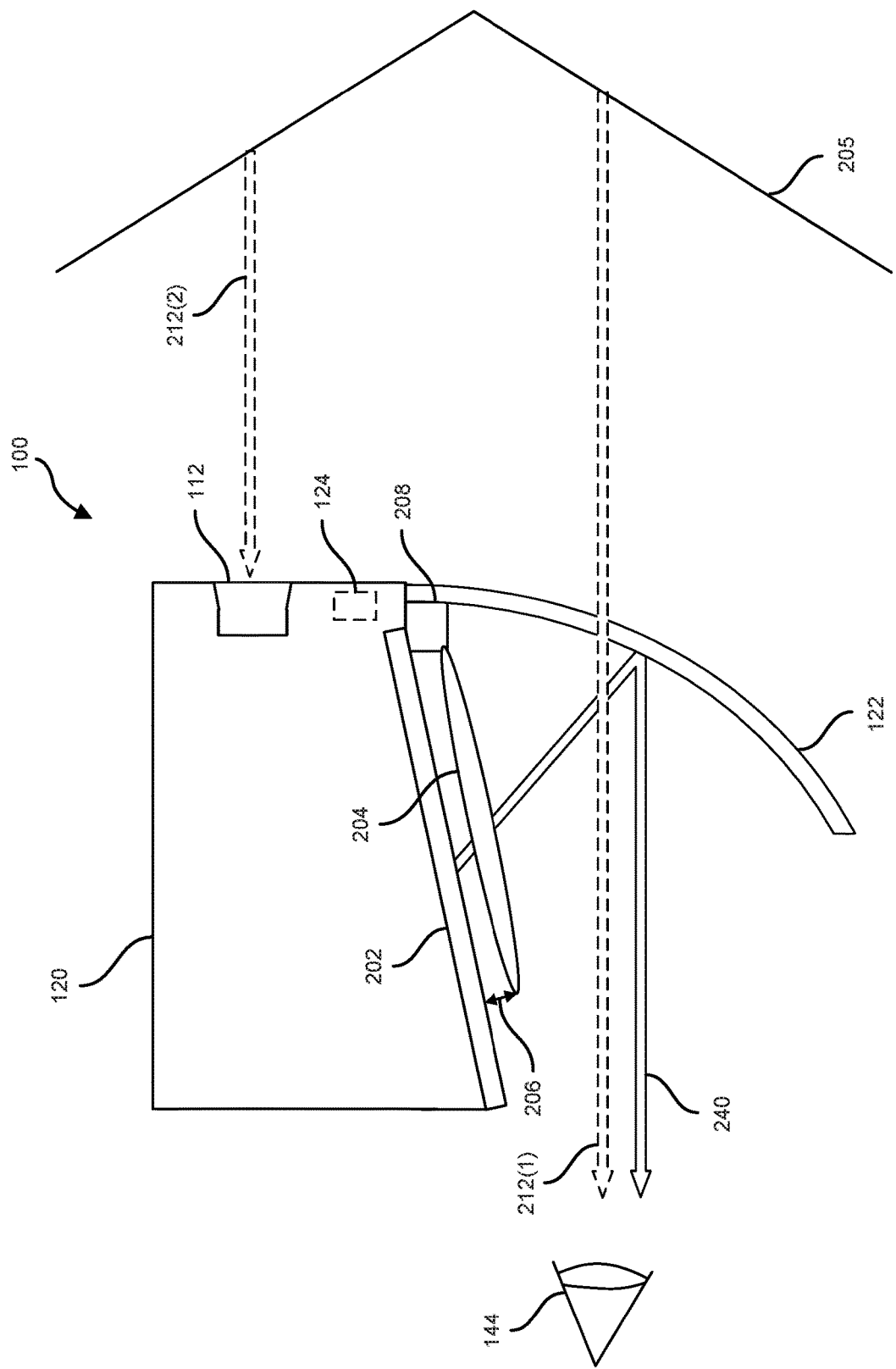
FIG. 2 is a side view of a display apparatus according to at least one embodiment of the present disclosure.

FIG. 2 illustrates a side view of the display apparatus 120 of the HMD system 100, according to one example. As shown in FIG. 2, the display apparatus 120 may include an electronic display 202 (e.g., an optical projector) disposed at an elevated height above the user's eye 144. In this example, the combiner 122 may reflect computer-generated images 240 projected from the electronic display 202 toward the user's eye 144. Additionally, a lens 204 may focus the computer-generated images 240 from the electronic display 202. The lens 204 may represent any type or form of transparent material that focuses light passing through the lens 204. In the example of FIG. 2, the display apparatus 120 may represent a periscope-style display that captures visible-spectrum light 212(2) from a local environment 205 using the photographic camera(s) 112 and subsequently projects the images 240 at a lower height based on captured visible-spectrum light 212(2).

In some embodiments, the electronic display 202 may emit visible-spectrum light to project the computer-generated images 240 toward the combiner 122. In these embodiments, the combiner 122 may include an angled surface that reflects the visible-spectrum light emitted by the electronic display 202 to direct the computer-generated images 240 toward the user's eye 144. For example, the interior surface of the combiner 122 may be curved and may include a reflective material. In another example, the combiner 122 may include electronic display capabilities and may receive the computer-generated images 240 for display to the user's eye 144.

Additionally, in some embodiments, the combiner 122 may include a transparent material that permits visible-spectrum light 212(1) from the local environment 205 to pass through the combiner 122 and reach the user's eye 144. For example, the combiner 122 may include glass or a transparent polymer that permits at least a portion of the visible-spectrum light 212(1) to travel through the combiner 122. Additionally or alternatively, the combiner 122 may be tinted such that the computer-generated images 240 may be clearly superimposed at a brighter contrast over the visible-spectrum light 212(1) that is visible to the user's eye 144.

In some examples, such as the example of FIG. 2, the lens 204 may be disposed between the electronic display 202 and the combiner 122 to control a variable focal length 206 of the display apparatus 120. In these examples, the lens 204 may focus the computer-generated images 240 to appear at a particular distance from the user's eye 144. Additionally or alternatively, the lens 204 may represent a part of the combiner 122, such as the interior surface of the combiner 122, which may be disposed between the user's eye 144 and the combiner 122 and/or may be disposed at the photographic camera(s) 112 to focus the incoming visible-spectrum light 212(2). In some examples, the lens 204 may include multiple lenses at one or more of the positions listed above.

In some embodiments, the display apparatus 120 may include the eye-tracking subsystem 124 that tracks the user's eye 144 to detect an eye position and/or movement of the user's eye 144. In these embodiments, a display actuator 208 may be dimensioned to move the lens 204 to change the focal length 206 based on the detected eye movement of the user's eye 144.

Figure 3:
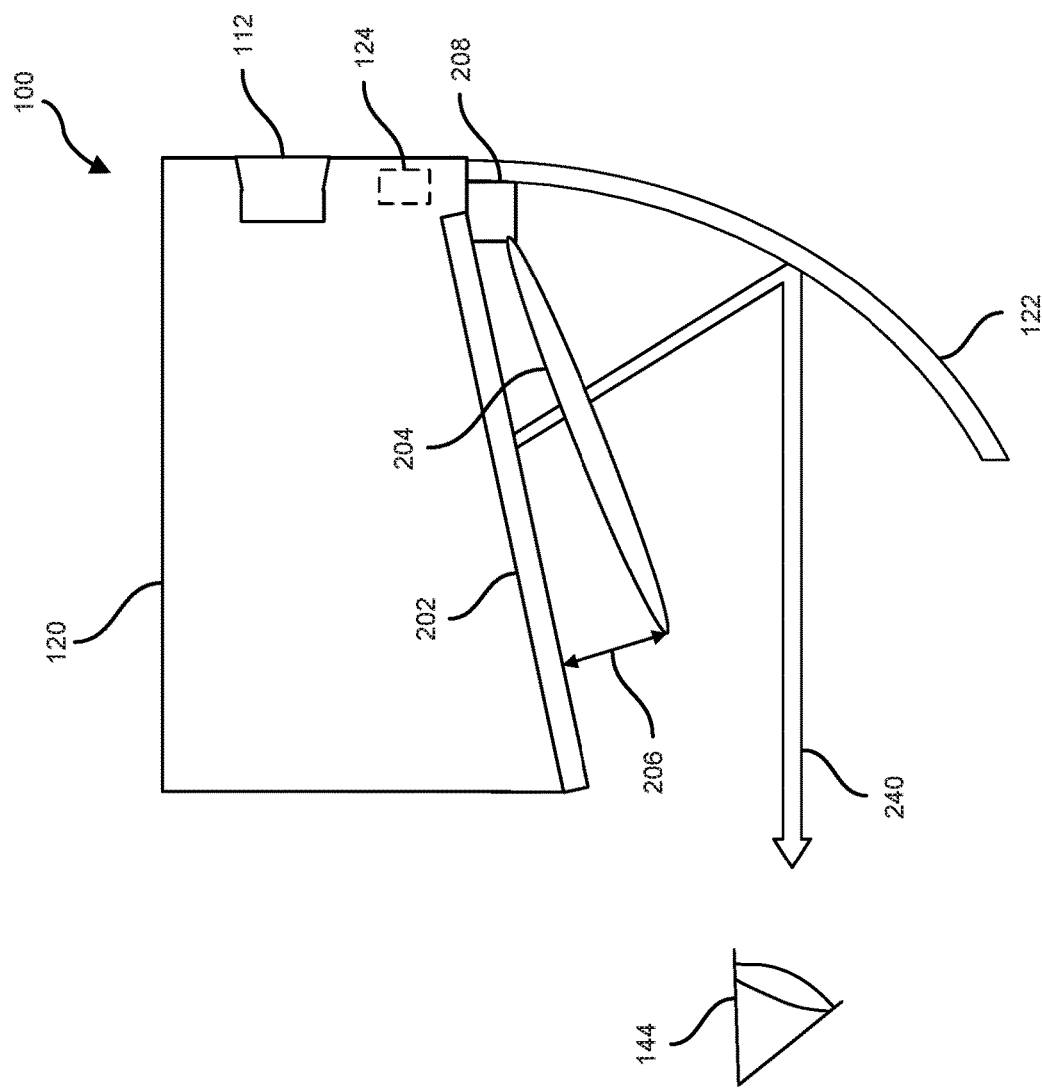
FIG. 3 is a side view of a display apparatus incorporating eye-tracking according to at least one embodiment of the present disclosure.

For example, FIG. 3 illustrates a side view of the display apparatus 120 incorporating eye-tracking of the user's eye 144. The display apparatus 120 may adjust the focal length 206 based on eye movement detected by the eye-tracking subsystem 124. As shown in the example of FIG. 3, the eye-tracking subsystem 124 may determine that the user's eye 144 is in a different (e.g., lower) position relative to the example shown in FIG. 2, thereby detecting the movement of the user's eye 144. The display actuator 208 may move the lens 204 to change the focal length 206 based on the detected eye movement. For example, the display actuator 208 may tilt the lens 204, adjust a space between the lens 204 and the electronic display 202, move the lens 204 to focus the computer-generated images 240 at a different portion of the lens 204, and/or make any other adjustment or combination of adjustments to focus the computer-generated images 240 from the electronic display 202 based on eye movement of the user's eye 244. In these examples, the combiner 122 may then reflect the computer-generated images 240 at an adjusted focal distance where the user's eye 244 may be viewing.

Figure 4:
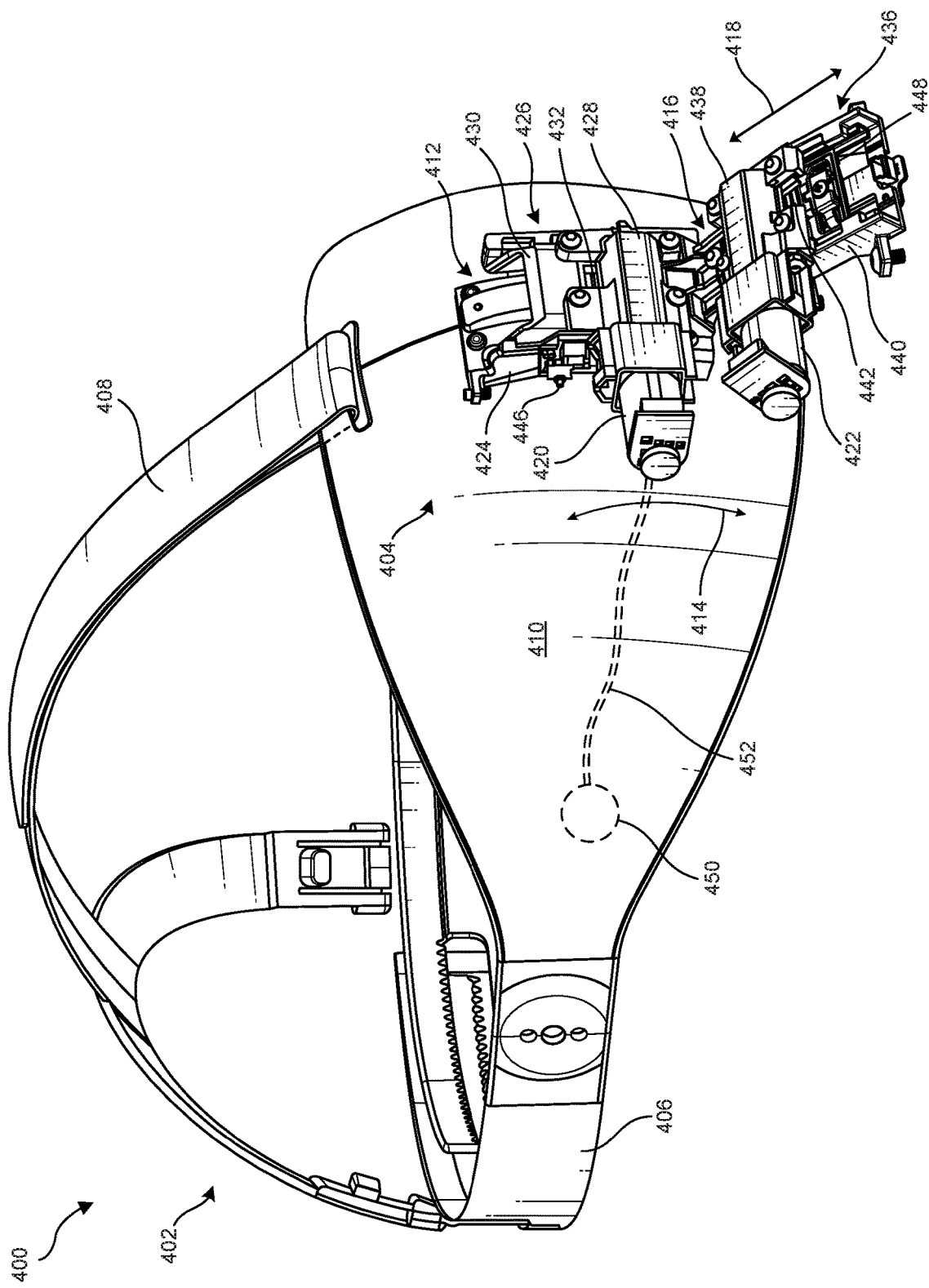
FIG. 4 is a perspective cutaway view of a head-mounted display system with an adjustment mechanism according to at least one embodiment of the present disclosure.
Figure 5:
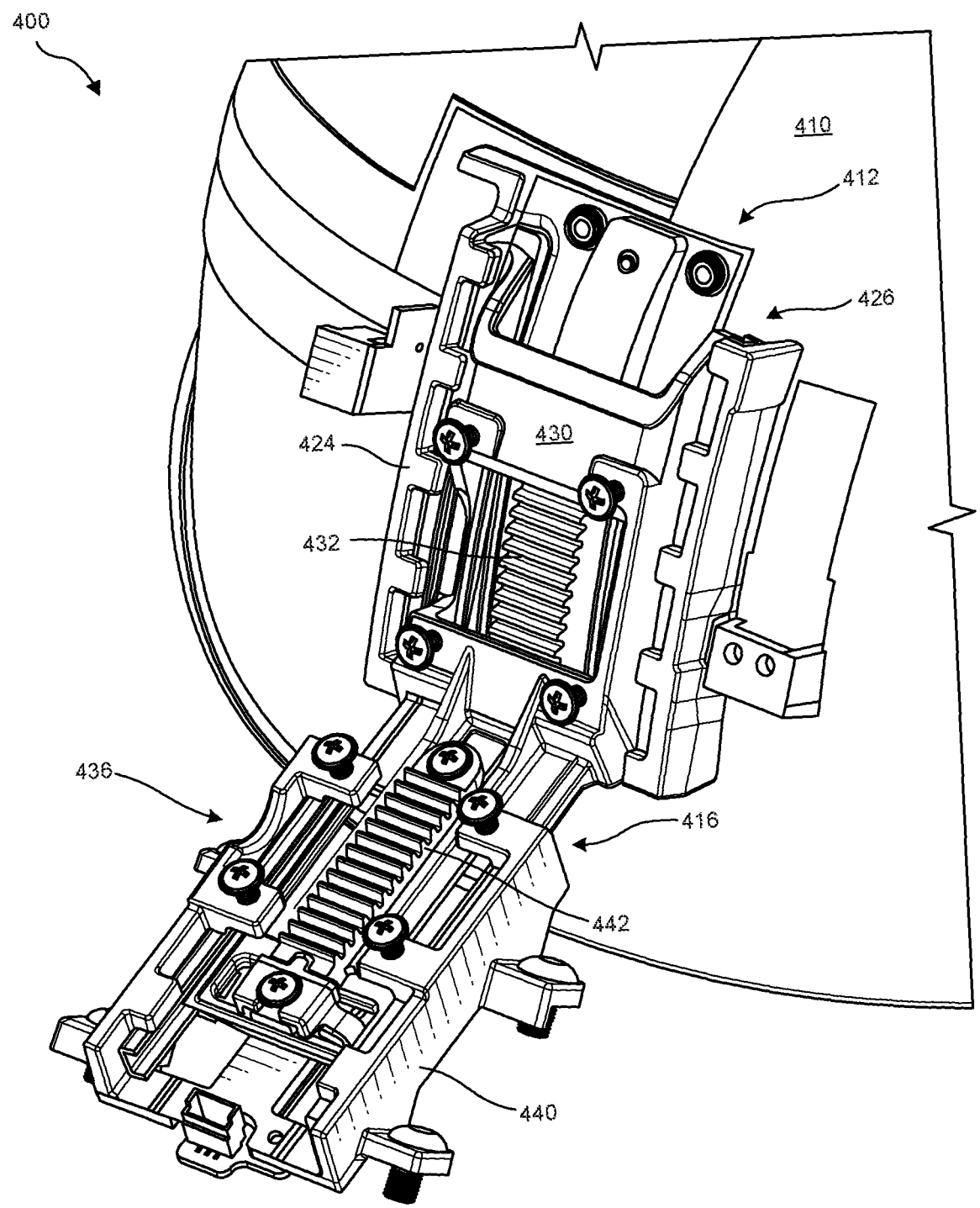
FIG. 5 is a perspective cutaway detailed view of the adjustment mechanism of FIG. 4.
Figure 6:
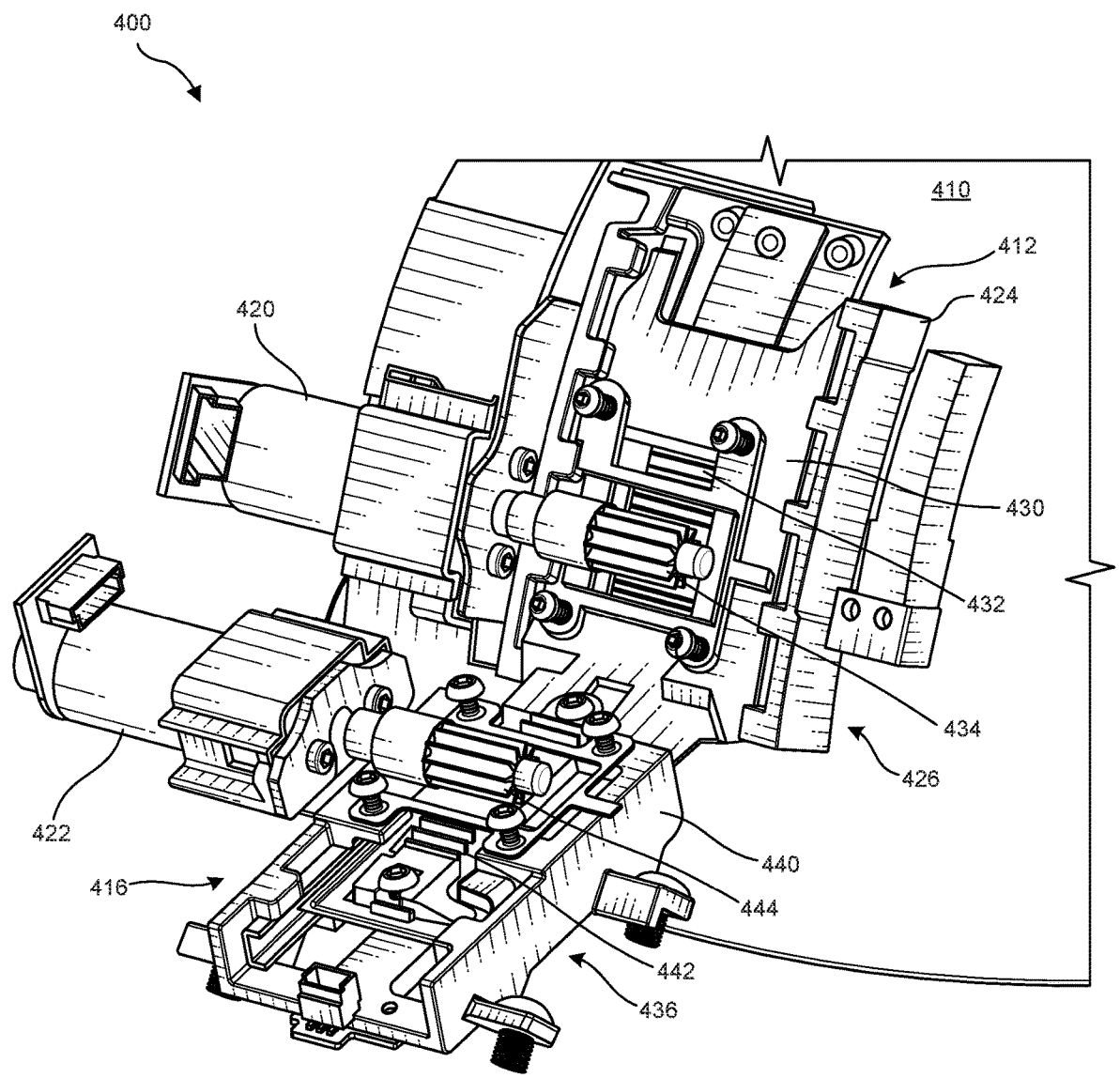
FIG. 6 is another perspective cutaway detailed view of the adjustment mechanism of FIG. 4.
Figure 7:
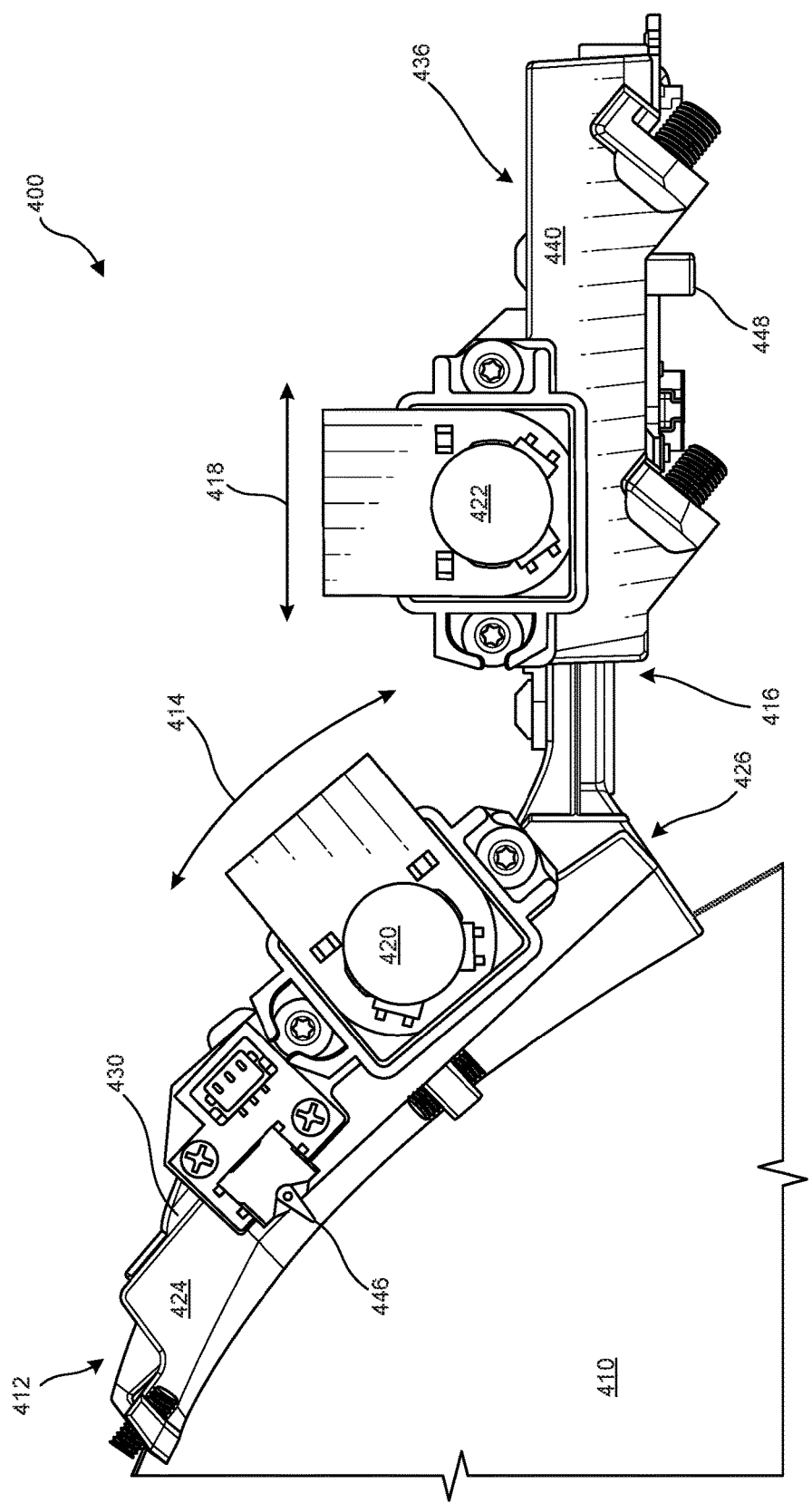
FIG. 7 is a side cutaway detailed view of the adjustment mechanism of FIG. 4.

FIG. 4 is a perspective view of an HMD system 400. Additional detailed views of portions of the HMD system 400 are shown in FIGS. 5-7. Portions of the HMD system 400, such as an associated display apparatus (e.g., the display apparatus 120 described above or another suitable display apparatus), are removed from FIGS. 4-7 to more clearly view underlying elements and features.

Referring to FIG. 4, the HMD system 400 may include a support assembly 402 and an adjustment mechanism 404. The support assembly 402 may be configured for mounting a display apparatus (e.g., the display apparatus 120 described above) to a user's head. The adjustment mechanism 404 may be configured for attaching the display apparatus to the support assembly 402 and for adjusting a position of the display apparatus relative to the support assembly 402 and, consequently, relative to the user's head and/or eyes.

By way of example and not limitation, the support assembly 402 may include a halo strap 406 configured to fit around the user's head, an over-head strap 408, and a forehead support 410. The halo strap 406 and/or the over-head strap 408 may be adjustable to provide a comfortable fit to a number of different users. The forehead support 410 may be shaped, sized, and configured to be positioned at least partially over the user's forehead. The components of the support assembly 402 may be formed separately and assembled together, or two or more of the components may be integrally formed.

Referring to FIGS. 4-7, the adjustment mechanism 404 may be coupled (e.g., bolted, adhered, welded, clipped, etc.) to the forehead support 410 of the support assembly 402. For example, the adjustment mechanism 404 may be configured to be positioned substantially over a lateral center of the user's forehead when the HMD system 400 is worn by the user. The adjustment mechanism 404 may include a first track 412 along which an associated display apparatus is configured to move in a first direction 414 (e.g., a substantially vertical direction). The adjustment mechanism 404 may also include a second track 416 along which the display apparatus is configured to move in a second, different direction 418 (e.g., a substantially horizontal direction). A first electromechanical actuator 420 (e.g., a first rotational motor) may be engaged with the first track 412 and a second electromechanical actuator 422 (e.g., a second rotational motor) may be engaged with the second track 416.

The first track 412 may include a forehead mount 424 for attaching to the forehead support 410 of the support assembly 402. The first track 412 may be configured to be positioned on the forehead support 410 substantially over a lateral (e.g., left and right) center of the user's forehead when the HMD system 400 is worn by the user. The first track 412 may also include a first slide assembly 426, which may include a protrusion slidably positioned within a corresponding groove, such that the first electromechanical actuator 420 may slide along first track 412. For example, a first housing 428 of the first electromechanical actuator 420 may be coupled to (e.g., bolted to, adhered to, welded to, integrally formed with, etc.) a slider 430. The slider 430 may include two protrusions that are respectively configured to slidably engage with two complementary grooves of the forehead mount 424. The first track 412 may also include a first toothed rack 432, with which the first electromechanical actuator 420 may be engaged (e.g., via a first pinion 434 thereof, as shown in FIG. 6).

Similarly, the second track 416 may include a second slide assembly 436, which may include a protrusion slidably positioned within a corresponding groove, such that the second electromechanical actuator 422 may slide along the second track 416. For example, a second housing 438 of the second electromechanical actuator 422 may be coupled to (e.g., bolted to, adhered to, welded to, integrally formed with, etc.) a display support bracket 440. The display support bracket 440 may be configured for mounting a corresponding display apparatus. The display support bracket 440 may include two grooves that are respectively configured to slidably engage with two complementary protrusions of the second track 416. For example, the second track 416 may include a second toothed rack 442, with which the second electromechanical actuator 422 may be engaged (e.g., via a second pinion 444 thereof, as shown in FIG. 6). The protrusions may extend outward from the second toothed rack 442 to engage with the corresponding grooves in the display support bracket 440.

In some embodiments, the slider 430 and the second track 416 may be coupled to (e.g., bolted to, adhered to, welded to, etc.) each other or integrally formed with each other as a unitary body. As can be seen in FIG. 5, for example, the slider 430 and the second track 416 are integrally formed with each other, forming a substantially L-shaped unitary body. In other words, the second track 416 and the second electromechanical actuator 422 may be coupled to the first housing 428 of the first electromechanical actuator 420 via the slider 430. Thus, when the first electromechanical actuator 420 is actuated, the slider 430 may move along the first track 412 in the first direction 414, resulting in movement of the second track 416, the second electromechanical actuator 422, the display support bracket 440, and ultimately the associated display apparatus in the first direction 414. At least one first limit switch 446 may be positioned and configured to stop actuation of the first electromechanical actuator 420 when the first slide assembly 426 reaches its maximum extension.

Actuation of the second electromechanical actuator 422 may result in movement of the second electromechanical actuator 422, the display support bracket 440, and the associated display apparatus in the second direction 418. At least one second limit switch 448 may be positioned and configured to stop actuation of the second electromechanical actuator 422 when the second slide assembly 436 reaches its maximum extension.

Like the user input mechanism 150 described above, the HMD system 400 may include at least one user input mechanism 450 for controlling actuation of the first electromechanical actuator 420 and the second electromechanical actuator 422. For example, the user input mechanism 450 may include at least one electromechanical control input mechanism, such as a knob, switch, slider, lever, or touch-sensitive mechanism. The user input mechanism 450 may be operably coupled (e.g., electrically connected) to the first electromechanical actuator 420 and to the second electromechanical actuator 422, such as via a wired or wireless connection 452. In additional embodiments, the user input mechanism 450 may include two separate electromechanical control input mechanisms, such as one for actuating the first electromechanical actuator 420 and another for actuating the second electromechanical actuator 422.

When the user desires to move the display apparatus, the user may manipulate the user input mechanism to actuate the first electromechanical actuator 420 and/or the second electromechanical actuator 422. In additional embodiments, actuation of the first electromechanical actuator 420 and/or the second electromechanical actuator 422 may be initiated through an interface displayed on the display apparatus (e.g., displayed by the display element 202 and reflected off the combiner 122, as described above). In further examples, actuation of the first electromechanical actuator 420 and/or the second electromechanical actuator 422 may be initiated (e.g., automatically without user interaction) in response to eye-tracking data, such as from the eye-tracking subsystem 124 described above with reference to FIGS. 1-3.

FIG. 8 is a flowchart illustrating a method 800 for positioning an HMD relative to a user's eyes. At operation 810, a display assembly may be moved along a first track in a first direction, which may be substantially vertical. Operation 810 may be performed in a variety of ways. For example, a movement request (e.g., a manual input) may be received from a user, such as by manipulation of at least one user input mechanism. As a result, a first electromechanical actuator may be actuated and may move the display assembly along the first track. For example, a first rotational motor may rotate a first pinion that is engaged with a first toothed rack to move the display assembly along the first track in the first direction.

At operation 820, the display assembly may be moved along a second track in a second direction, which may be substantially horizontal. Operation 820 may be performed in a variety of ways. For example, a movement request (e.g., a manual input) may be received from the user, such as by manipulation of the user input mechanism. As a result, a second electromechanical actuator may be actuated and may move the display assembly along the second track. For example, a second rotational motor may rotate a second pinion that is engaged with a second toothed rack to move the display assembly along the second track in the second direction.

Accordingly, disclosed are systems and methods for positioning an HMD relative to a user's eyes, such as to accommodate variable shapes and sizes of users' heads and facial features. The systems may include a first electromechanical actuator for moving the display in a substantially vertical direction and a second electromechanical actuator for moving the display in a substantially horizontal direction. The actuators may be controlled by a user input mechanism, which may be intuitive for the user to manipulate.

Embodiments of the present disclosure may include or be implemented in conjunction with various types of artificial-reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may include a near-eye display ("NED") that provides visibility into the real world (e.g., the HMD system 100 in FIGS. 1-3 or the HMD system 400 in FIGS. 4-7) or that visually immerses a user in an artificial reality (e.g., a virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 900 in FIG. 9, that mostly or completely covers a user's field of view. The virtual-reality system 900 may include a front rigid body 902 and a band 904 shaped to fit around a user's head. The virtual-reality system 900 may also include output audio transducers 906(A) and 906(B). Furthermore, while not shown in FIG. 9, the front rigid body 902 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in the augmented-reality systems 100, 400 and/or the virtual-reality system 900 may include one or more liquid crystal displays (LCDs), light-emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in the augmented-reality systems 100, 400 and/or the virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image-projection system.

Artificial-reality systems may also include various types of computer vision components and subsystems. For example, the augmented-reality systems 100, 400 and/or the virtual-reality system 900 may include one or more optical sensors, such as 2D or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 9, the output audio transducers 906(A), and 906(B) may include voice coil speakers, ribbon speakers, electrostatic speakers, piezoelectric speakers, bone conduction transducers, cartilage conduction transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

While not shown in FIGS. 1-7 and 9, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

By way of example and not limitation, some embodiments of the present disclosure include the following:

Example 1: A system for positioning head-mounting displays, the system including: a first track along which a display apparatus of a head-mounted display is configured to move in a first direction, wherein the display apparatus is configured to display computer-generated imagery to a user; a second track along which the display apparatus is configured to move in a second, different direction; a first electromechanical actuator for moving the display apparatus along the first track in the first direction; and a second electromechanical actuator for moving the display apparatus along the second track in the second direction.

Example 2: The system of Example 1, further including a user input mechanism for controlling actuation of the first electromechanical actuator and of the second electromechanical actuator.

Example 3: The system of Example 2, wherein the user input mechanism includes at least one mechanical input mechanism that is electrically connected to the first electromechanical actuator and to the second electromechanical actuator.

Example 4: The system of any of Examples 1 through 3, wherein the first electromechanical actuator includes a first rotational motor and the second electromechanical actuator includes a second rotational motor.

Example 5: The system of any of Examples 1 through 4, further including a display support bracket that is configured to support the display apparatus, wherein the display support bracket is rigidly coupled to a housing of the second electromechanical actuator.

Example 6: The system of any of Examples 1 through 5, further including at least one first limit switch for limiting movement of the display apparatus along the first track and at least one second limit switch for limiting movement of the display apparatus along the second track.

Example 7: The system of any of Examples 1 through 6, wherein the second track is supported by a housing of the first electromechanical actuator.

Example 8: A head-mounted display system, including: a display apparatus for displaying computer-generated imagery to a user; a support assembly for mounting the display apparatus to the user's head; a first track coupled to the support assembly, along which the display apparatus is configured to move in a first direction that is substantially vertical relative to the user's eyes; a second track along which the display apparatus is configured to move in a second direction that is substantially horizontal relative to the user's eyes; a first electromechanical actuator for moving the display apparatus along the first track; and a second electromechanical actuator for moving the display apparatus along the second track.

Example 9: The head-mounted display system of Example 8, wherein the first electromechanical actuator includes a first rotational motor and the second electromechanical actuator includes a second rotational motor.

Example 10: The head-mounted display system of Example 8 or Example 9, further including at least one electromechanical control input mechanism in electrical communication with the first electromechanical actuator and with the second electromechanical actuator, wherein the at least one electromechanical control input mechanism is configured to actuate the first electromechanical actuator and the second electromechanical actuator.

Example 11: The head-mounted display system of Example 10, wherein the at least one electromechanical control input mechanism includes a first electromechanical control input mechanism for actuating the first electromechanical actuator and a second electromechanical control input mechanism for actuating the second electromechanical actuator.

Example 12: The head-mounted display system of Example 10 or Example 11, wherein the at least one electromechanical control input mechanism includes at least one of a knob, switch, slider, lever, or touch-sensitive mechanism.

Example 13: The head-mounted display system of any of Examples 8 through 12, wherein the first track includes a first toothed rack and the second track includes a second toothed rack.

Example 14: The head-mounted display system of any of Examples 8 through 13, wherein the first track includes a first slide assembly and the second track includes a second slide assembly.

Example 15: The head-mounted display system of any of Examples 8 through 14, wherein the first track is configured to be positioned on the support assembly substantially over a lateral center of the user's forehead when the head-mounted display system is worn by the user.

Example 16: The head-mounted display system of any of Examples 8 through 15, wherein the display apparatus includes an optical projector and an optical combiner.

Example 17: A method for positioning a head-mounted display, the method including: moving a display apparatus for displaying computer-generated imagery to a user along a first track in a first direction that is substantially vertical relative to the user's eyes, wherein the display apparatus is configured to be mounted to the user's head via a support assembly; and moving the display apparatus along a second track in a second direction that is substantially horizontal relative to the user's eyes.

Example 18: The method of Example 17, further including receiving a movement request from the user, wherein the movement of the display apparatus along the first track and the movement of the display apparatus along the second track are performed in response to receiving the movement request from the user.

Example 19: The method of Example 17 or Example 18, further including receiving a manual input from the user, wherein the movement of the display apparatus along the first track and the movement of the display apparatus along the second track are performed in response to receiving the manual input from the user.

Example 20: The method of any of Examples 17 through 19, wherein: moving the display apparatus along the first track includes rotating a first pinion with a first rotational motor to move the display apparatus along a first toothed rack engaged with the first pinion; and moving the display apparatus along the second track includes rotating a second pinion with a second rotational motor along a second toothed rack engaged with the second pinion.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system for positioning head-mounted displays, the system comprising:
   a first track along which a display apparatus of a head-mounted display is configured to move in a first direction, wherein the display apparatus is configured to display computer-generated imagery to a user, wherein the first track is positioned to be located substantially over a lateral center of the user's forehead when the system is worn by the user;

a second track along which the display apparatus is configured to move in a second, different direction;
a first electromechanical actuator for moving the display apparatus along the first track in the first direction; and
a second electromechanical actuator for moving the display apparatus along the second track in the second direction.

2. The system of claim 1, further comprising a user input mechanism for controlling actuation of the first electromechanical actuator and of the second electromechanical actuator.

3. The system of claim 2, wherein the user input mechanism comprises at least one mechanical input mechanism that is electrically connected to the first electromechanical actuator and to the second electromechanical actuator.

4. The system of claim 1, wherein the first electromechanical actuator comprises a first rotational motor and the second electromechanical actuator comprises a second rotational motor.

5. The system of claim 1, further comprising a display support bracket that is configured to support the display apparatus, wherein the display support bracket is rigidly coupled to a housing of the second electromechanical actuator.

6. The system of claim 1, further comprising at least one first limit switch for limiting movement of the display apparatus along the first track and at least one second limit switch for limiting movement of the display apparatus along the second track.

7. The system of claim 1, wherein the second track is supported by a housing of the first electromechanical actuator.

8. The system of claim 1, wherein the first direction follows a curved path.

9. A head-mounted display system, comprising:
a display apparatus for displaying computer-generated imagery to a user;
a support assembly for mounting the display apparatus to the user's head;
a first track coupled to the support assembly, along which the display apparatus is configured to move in a first direction that is substantially vertical relative to the user's eyes;
a second track along which the display apparatus is configured to move in a second direction that is substantially horizontal relative to the user's eyes, wherein the first track is configured to be positioned on the support assembly substantially over a lateral center of the user's forehead when the head-mounted display system is worn by the user;
a first electromechanical actuator for moving the display apparatus along the first track; and
a second electromechanical actuator for moving the display apparatus along the second track.

10. The head-mounted display system of claim 9, wherein the first electromechanical actuator comprises a first rotational motor and the second electromechanical actuator comprises a second rotational motor.

11. The head-mounted display system of claim 9, further comprising at least one electromechanical control input mechanism in electrical communication with the first electromechanical actuator and with the second electromechanical actuator, wherein the at least one electromechanical control input mechanism is configured to actuate the first electromechanical actuator and the second electromechanical actuator.

12. The head-mounted display system of claim 11, wherein the at least one electromechanical control input mechanism comprises a first electromechanical control input mechanism for actuating the first electromechanical actuator and a second electromechanical control input mechanism for actuating the second electromechanical actuator.

13. The head-mounted display system of claim 11, wherein the at least one electromechanical control input mechanism comprises at least one of a knob, switch, slider, lever, or touch-sensitive mechanism.

14. The head-mounted display system of claim 9, wherein the first track comprises a first toothed rack and the second track comprises a second toothed rack.

15. The head-mounted display system of claim 9, wherein the first track comprises a first slide assembly and the second track comprises a second slide assembly.

16. The head-mounted display system of claim 9, wherein the display apparatus comprises an optical projector and an optical combiner.

17. A method for positioning a head-mounted display, the method comprising:
moving a display apparatus for displaying computer-generated imagery to a user along a first track in a first direction that is substantially vertical relative to the user's eyes, wherein the display apparatus is configured to be mounted to the user's head via a support assembly, wherein the first track is positioned on the support assembly substantially over a lateral center of the user's forehead when the support assembly is worn by the user; and
moving the display apparatus along a second track in a second direction that is substantially horizontal relative to the user's eyes.

18. The method of claim 17, further comprising receiving a movement request from the user, wherein the movement of the display apparatus along the first track and the movement of the display apparatus along the second track are performed in response to receiving the movement request from the user.

19. The method of claim 17, further comprising receiving a manual input from the user, wherein the movement of the display apparatus along the first track and the movement of the display apparatus along the second track are performed in response to receiving the manual input from the user.

20. The method of claim 17, wherein:
moving the display apparatus along the first track comprises rotating a first pinion with a first rotational motor to move the display apparatus along a first toothed rack engaged with the first pinion; and
moving the display apparatus along the second track comprises rotating a second pinion with a second rotational motor along a second toothed rack engaged with the second pinion.

* * * * *